United States Patent
Krummrich et al.

(10) Patent No.: US 6,556,341 B2
(45) Date of Patent: Apr. 29, 2003

(54) OPTICAL TRANSMISSION SYSTEM HAVING CASCADED RAMAN

(75) Inventors: Peter Krummrich, Munich (DE); Richard Neuhauser, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/990,735

(22) Filed: Nov. 21, 2001

(65) Prior Publication Data

US 2002/0093724 A1 Jul. 18, 2002

(30) Foreign Application Priority Data

Nov. 21, 2000 (DE) .......................... 100 57 659

(51) Int. Cl.$^7$ ................................ H01S 3/00
(52) U.S. Cl. ................ 359/334; 359/337.1; 359/337.4
(58) Field of Search ............... 359/334, 337.1, 359/337.4

(56) References Cited

U.S. PATENT DOCUMENTS

| | | | |
|---|---|---|---|
| 5,050,949 A | * | 9/1991 | DiGiovanni et al. ........ 359/341 |
| 6,052,394 A | | 4/2000 | Lee et al. |
| 6,115,174 A | | 9/2000 | Grubb et al. |
| 6,163,636 A | * | 12/2000 | Stentz et al. ................ 385/24 |

FOREIGN PATENT DOCUMENTS

| | | |
|---|---|---|
| EP | 1 018 666 A1 | 7/2000 |
| EP | 1 022 870 A2 | 7/2000 |
| JP | 02002229083 A  * | 8/2002 |

* cited by examiner

Primary Examiner—Mark Hellner
(74) Attorney, Agent, or Firm—Bell Boyd & Lloyd LLC

(57) ABSTRACT

An optical transmission system for wavelength-division multiplex signals, having cascaded Raman amplifiers, has a number of pump sources for each Raman amplifier, each having different pump wavelengths sets from one pump source to another pump source. This results in a flat gain spectrum for all the channels in a WDM transmission signal.

16 Claims, 3 Drawing Sheets

OPTICAL TRANSMISSION SYSTEM HAVING CASCADED RAMAN

BACKGROUND OF THE INVENTION

Amplifier or booster modules are required after respective transmission sections for transmitting an optical WDM signal along long fiber paths. One effective method for additional amplification of a signal is based on stimulated Raman scatter, in which a pump signal is fed into the transmission fiber. The pump signal is produced via a number of pump sources, generally laser diodes. The use of a number of pump wavelengths leads to a broad, flat gain spectrum.

The document EP 0139081 B1, "Optical Communications System Using Raman Repeaters and Components Therefor", discloses a cascaded Raman amplifier system with different amplifiers (RA1, RA2 ...). These amplifiers have a number of pump sources (column 8, lines 21–28) which inject their pump power for Raman amplification of a WDM signal into the transmission fiber. The Raman gain spectrum thus becomes flatter; that is, the WDM channels will have similar levels at the output of the transmission fiber that forms the Raman amplifier (column 8, lines 32–35).

The wavelength set of pump sources is chosen such that all the channels of the WDM signal have as uniform a gain as possible, taking account of the Raman gain spectrum (see "Fiber Optic Communication Systems", G. P. Agrawal, 2nd Edition, p. 381, FIG. 8.11). A channel with a frequency shift of 13.2 THz with respect to a pump frequency is amplified to the maximum extent. If there is a smaller or greater frequency difference between a channel and a pump signal, then the channel is amplified to a lesser extent. The use of a greater number of different pump wavelengths allows all the channels in the WDM transmission signal to be amplified more homogeneously.

The use of a large number of pump sources is described, for example, in "1-THz-Spaced Multi-Wavelength Pumping For Broadband Raman Amplifiers", ECOC 2000, 26th European Conference on Optical Communication, Sept. 3–7, Proceedings Vol. 2, Sep. 5, 2000, p. 73–74". The pump source has 16 wavelength-division multiplexed pump lasers (laser diodes) with a frequency separation of 1 THz (introduction, §2, lines 22–23), whose signals are fed into the transmission fiber. The channels of the WDM signal in C-band and L-band (1527–1607 nm) are thus amplified with Raman gain differences of less than 0.1 dB. No additional filter (gain flattening filter) is required. According to FIG. 3 in this reference, a slight ripple is still evident in the gain spectrum, but this is less than 0.1 dB.

In addition, trials also have been carried out with more than 16 pump lasers in order to flatten the gain spectrum. "Messungen an Erbium-dotierten Faserverstärken für WDM-Systeme", [Measurements on erbium-doped fiber amplifiers for WDM systems] NTZ (Informationstechnik+ Telekommunikation), Issue May 5, 2000, p. 60–63, describes an arrangement with up to 38 lasers in the pump source (FIG. 3, "Influence of the number of laser sources on the measurement accuracy for indirect measurement"). The gain spectrum has a very flat region for a bandwidth of less than 40 nm.

Restricting the number of pump sources for an amplifier causes greater ripple in the amplitude spectrum of the amplified WDM signal. This effect will have an even greater adverse effect on the transmission if a number of identical Raman amplifiers are arranged in cascade for further transmission paths, since these disturbance effects are additive.

What are referred to as gain flattening filters ("Fiber Optic Communication Systems", G. P. Agrawal, 2nd Edition, page 415) allows these channel level differences after each amplifier module to be reduced. These filters have a corresponding greater attenuation for wavelengths at higher levels.

The described methods thus propose ways in which the gain spectrum of a Raman amplifier becomes flatter within the bandwidth (C+L-band or narrower) of the WDM signal to be amplified, by increasing the number of pump sources. Nevertheless, filters are still sometimes required in order to minimize the gain spectrum differences. All these methods are highly complex.

An object of the present invention is, thus, to achieve a flat gain spectrum, with less complexity, in a WDM transmission system with cascaded Raman amplifiers.

SUMMARY OF THE INVENTION

In the transmission system according to the present invention, the cascaded Raman amplifiers are provided by pump signals with different wavelength sets, so that the disturbing gain fluctuations along the transmission path are compensated for.

After one Raman amplifier stage, the gain spectrum will still have a relatively large amount of ripple (peaks or troughs). The pump wavelengths of two cascaded Raman amplifiers are therefore chosen such that the gain spectrum of the second amplifier has peaks at the points at which the first amplifier has troughs, and vice versa. The fluctuations of the two gain spectra thus compensate for one another, and the sum of the two gain spectra leads to less ripple. This can be achieved, for example, in the case of two successive amplifier stages by offsetting the pump wavelength sets by about half the pump wavelength interval. The pump wavelength interval in this case refers, by way of example, to the mean interval between the pump wavelengths of spectrally adjacent laser diodes in a pump source. In a transmission system with N cascaded Raman amplifiers, an offset of about 1/N of the pump wavelength interval is chosen between the respective pump wavelength sets. If the gain spectrum does not have periodic artifacts after one or more amplifier stages, that is to say irregularly distributed peaks or troughs, the pump wavelength is corrected individually, so as to provide appropriate compensation for the disturbances in the final gain spectrum.

A transmission path also may be formed by periodic sequences of two or more successive Raman amplifiers, which have different wavelength sets to one another. In configurations such as these, a maximum number of four Raman amplifiers with offset wavelength sets is sufficient in practice. Although a greater number is also feasible, this involves greater complexity.

The use of different pump wavelength sets has the major advantage that only a small number of pump sources are required for each Raman amplifier, since the gain differences are adequately compensated for along all the sections of the transmission path. The WDM signal at the receiving end of the entire path will have minor level differences if the pump wavelengths of the Raman amplifiers are advantageously shifted with respect to one another.

In consequence, and in addition, no filters (gain flattening filters) are required to minimize the level differences after each amplifier or at the end of the transmission path.

The pump power levels and the spectral widths of the pump channels are chosen so as to avoid the effects of stimulated Brillouin scatter SBS. A normal SBS threshold is around a maximum of 10 mW within the Brillouin bandwidth of 20 MHz.

Depending on the requirements, the pump signals can be fed into the transmission sections either codirectionally or contradirectionally.

Additional features and advantages of the present invention are described in, and will be apparent from, the following Detailed Description of the Invention and the Figures.

DETAILED DESCRIPTION OF THE INVENTION

Figure 1:
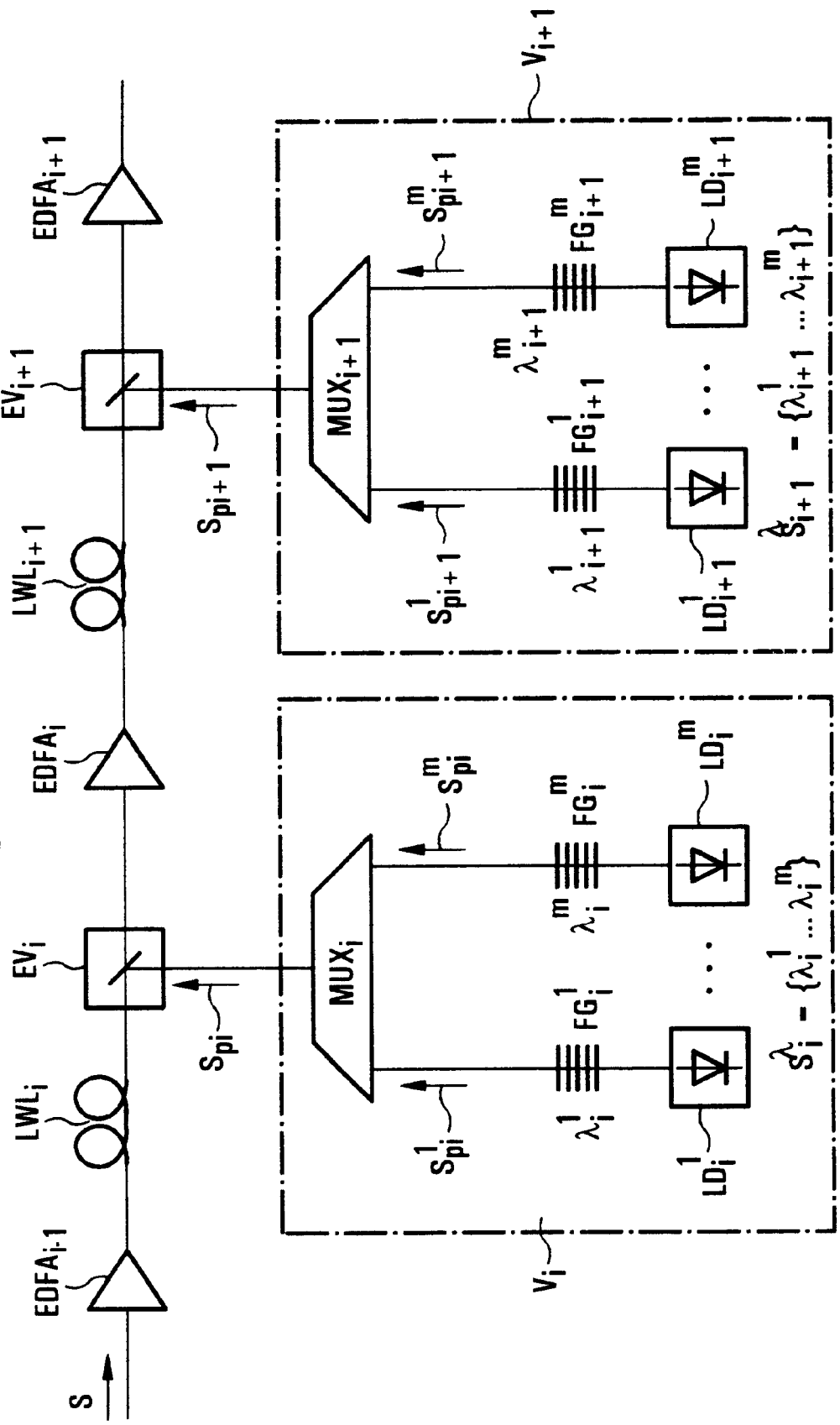
FIG. 1 shows a section of the transmission system with cascaded Raman amplifiers.

FIG. 1 shows a section of the transmission path with two Raman amplifiers $V_i$ and $V_{i+1}$. A WDM signal S is fed in at the input of the transmission path. The transmission path has two optical waveguide sections $LWL_{i-1}$ and $LWL_i$ with fiber amplifiers $EDFA_{i-1}$, $EDFA_i$, $EDFA_{i+1}$. The fiber amplifier $EDFA_i$ is preceded by a Raman amplifier $V_i$, in which a sum pump signal $S_{pi}$ is fed in via an injection device $EV_i$ in the opposite direction to the direction in which the WDM signal propagates. The sum pump signal $S_{pi}$ consists of the signals of the pump sources $LD^1_i, \ldots, LD^m_i$. These are combined via a multiplexer $MUX_i$ to form the sum pump signal $S_{pi}$. The pump sources (laser diodes) $LD^1_i, \ldots, LD^m_i$ of the Raman amplifiers $V_i$ respectively produce m pump signals at the wavelengths ($\lambda^1_i, \ldots, \lambda^m_i$). The respective m pump signals of a Raman amplifier are spectrally stabilized via fiber gratings ($FG^1_i, \ldots, FG^m_i$), and are then supplied to the multiplexer $MUX_i$. The sum pump signal $S_{pi+1}$ of the next Raman amplifier $V_{i+1}$ with the same structure as $V_i$ is fed into the transmission fiber after a further transmission section ($EDFA_{i+1}+LWL_{i+1}$). The pump wavelengths $\lambda^1_{i+1}, \ldots, \lambda^m_{i+1}$ of the pump sources $LD^1_{i+1}, \ldots, LD^m_{i+1}$, of the Raman amplifier $V_{i+1}$ are chosen such that they are offset by about half the pump wavelength interval from the wavelengths $\lambda^1_i, \ldots, \lambda^m_i$. This compensates for the irregular gain spectrum of an individual Raman amplifier.

Figure 2:
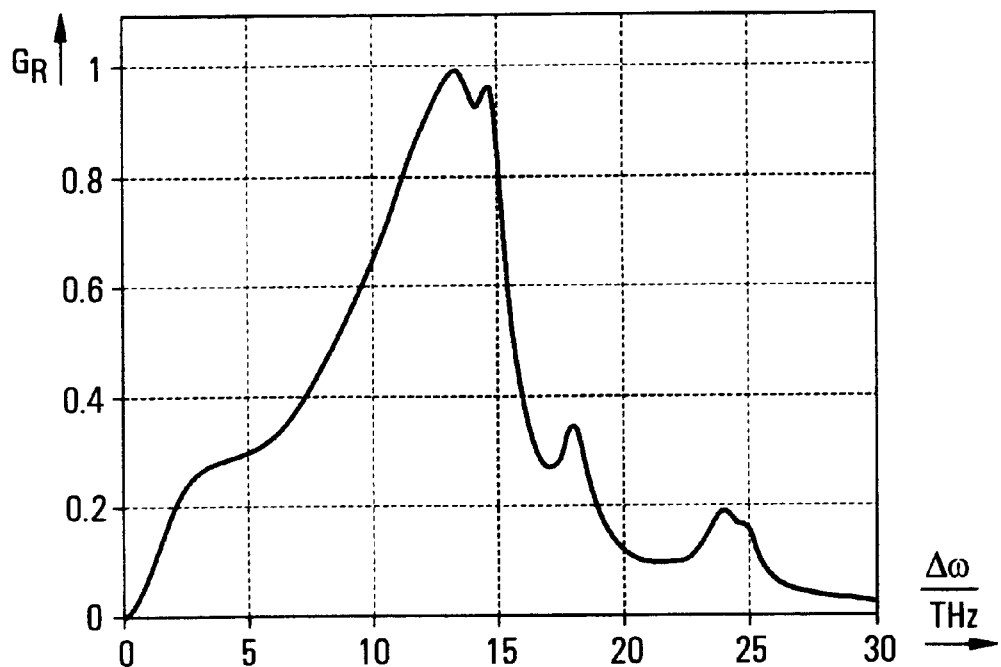
FIG. 2 shows the normalized Raman gain as a function of the frequency difference between the pump channel and transmission channel.

FIG. 2 shows the normalized gain $G_R$ of the Raman amplification as a function of the frequency difference $\alpha\omega$ (Stokes shift) between a transmission signal and a pump signal. The maximum gain is achieved when there is a frequency difference of 13.2 THz between a WDM signal and a pump signal.

Figure 3:
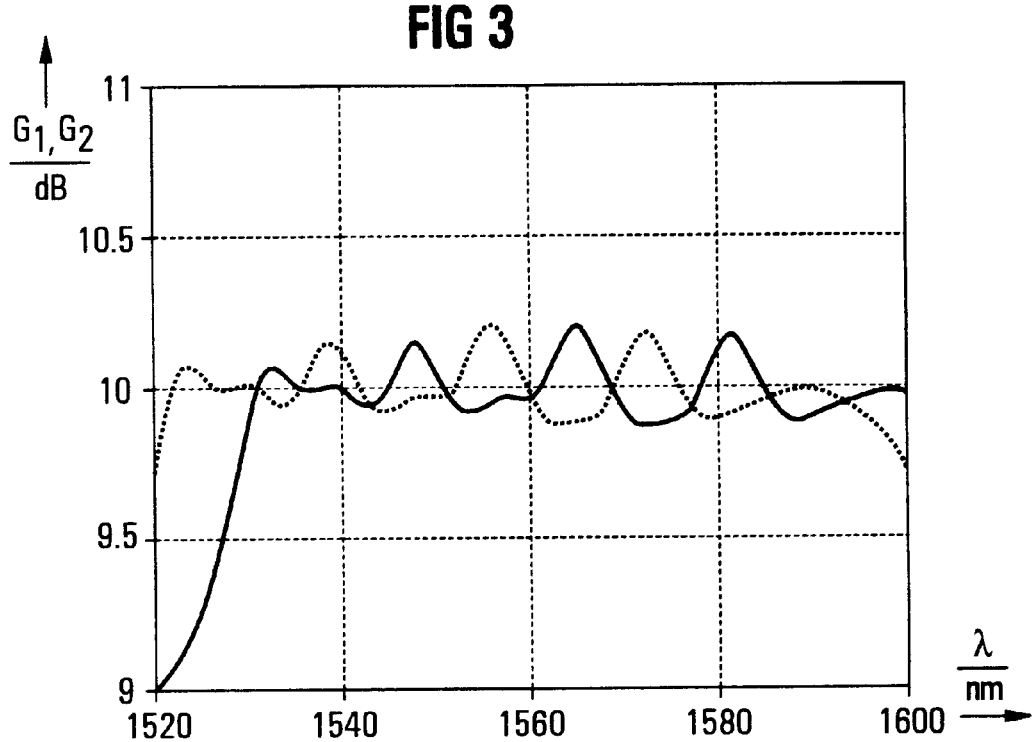
FIG. 3 shows individual gain spectra of two Raman amplifiers in the optical transmission system according to the present invention.

FIG. 3 shows the individual gain spectra $G_1$ (solid line) and $G_2$ of the two Raman amplifiers. The shift in the wavelength set in the second Raman amplifier likewise causes a shift in the second gain spectrum, which has a similar form to the first gain spectrum. An optimum shift in the wavelength set of the second amplifier stage with respect to the first is achieved when the sum of the two gain spectra has the minimum amplitude differences.

Figure 4:
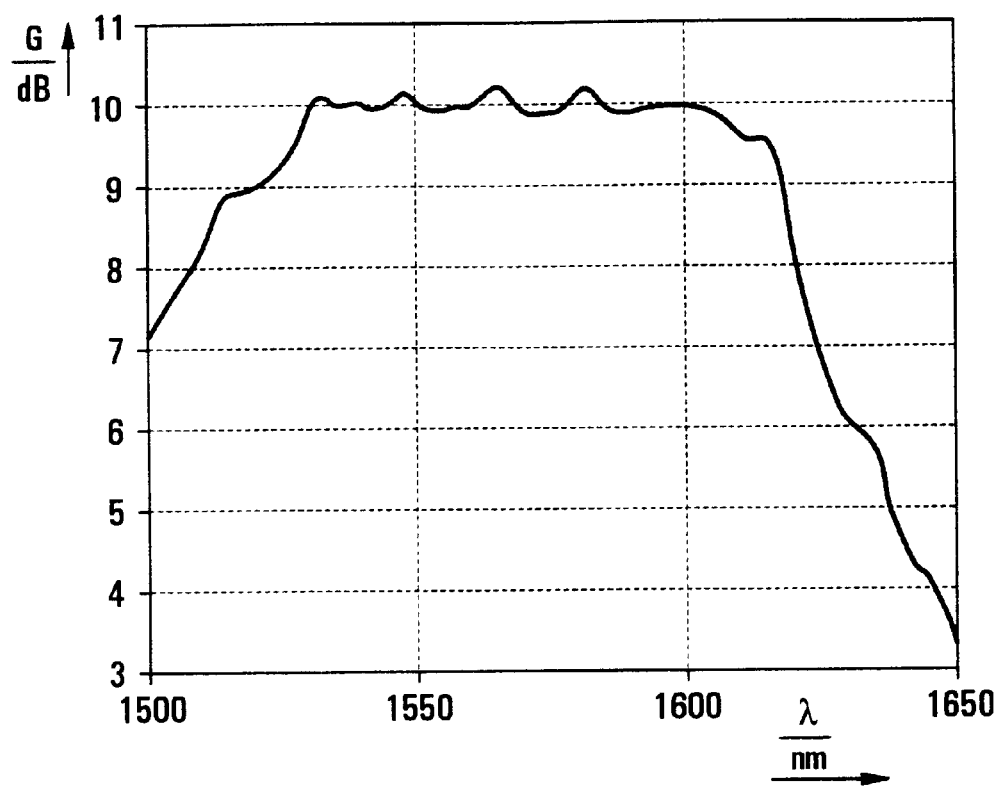
FIG. 4 shows the accumulated gain spectrum, after two cascaded Raman amplification stages, of the optical transmission system according to the present invention.

FIG. 4 shows the gain spectrum G for a WDM signal with a bandwidth of 1530 to 1600 nm after two Raman amplifiers $V_1$, $V_{i+1}$ (see FIG. 1). Both pump sources each have 8 laser diodes. The pump sources in the first Raman amplifier have the following wavelengths: 1409 nm, 1424 nm, 1438 nm, 1453 nm, 1467 nm, 1482 nm, 1497 nm, 1513 nm. The pump wavelengths of the second Raman amplifier are shifted by 9 nm in the direction of shorter wavelengths in comparison to those of the first Raman amplifier.

The ripple in the gain spectrum can be reduced further by using more than two Raman amplifiers, and individual correction of the pump wavelengths.

Although the present invention has been described with reference to specific embodiments, those of skill in the art will recognize that changes may be made there to without departing from the spirit and scope of the invention as set forth in the hereafter appended claims.

What is claimed is:

1. An optical transmission system, comprising a plurality of cascaded Raman amplifiers which each include a plurality of pump sources, wherein, in order to achieve a flat gain spectrum for a signal which has a plurality of optical channels, the plurality of pump sources have at least two different wavelength sets respectively associated with at least two different Raman amplifiers.

2. An optical transmission system as claimed in claim 1, further comprising:
   a plurality of multiplexers, each multiplexer respectively associated with one of the Raman amplifiers for combining the pump signals emitted from the pump sources of the respected Raman amplifier.

3. The optical transmission system as claimed in claim 1, further comprising:
   a plurality of injection devices, each injection device associated with the respective one of the Raman amplifiers and being provided for injecting a sum pump signal of the respective Raman amplifier into a transmission fiber.

4. An optical transmission system as claimed in claim 1, wherein the pump sources are laser diodes.

5. An optical transmission system as claimed in claim 1, wherein the at least two pump wavelength sets are each shifted through approximately half a wavelength separation between two adjacent pump sources with respect to one another between two of the Raman amplifiers.

6. An optical transmission system as claimed in claim 1, wherein, in a transmission path with N Raman amplifiers, the pump wavelength sets are shifted with respect to one another by approximately 1/N of a wavelength separation between two adjacent pump sources.

7. An optical transmission system as claimed in claim 1, wherein the wavelengths of the pump signals of the Raman amplifiers are chosen individually such that the gain spectrum has minimum differences.

8. An optical transmission system as claimed in claim 1, wherein the transmission path has successive Raman amplifiers with a maximum of four different pump wavelength sets.

9. An optical transmission system as claimed in claim 1, wherein a power of the pump sources within the bandwidth of the stimulated Brillouin scatter is below a stimulated Brillouin scatter threshold.

10. The optical transmission system as claimed in claim 1, further comprising:
    a plurality of optical filter sets, wherein outputs of the pump sources are connected to respective optical filter sets for selection and stabilization of pump wavelengths of the respective Raman amplifier.

11. An optical transmission system as claimed in claim 10, wherein the pump sources are laser diodes.

12. An optical transmission system as claimed in claim 10, wherein the at least two pump wavelength sets are each shifted through approximately half a wavelength separation between two adjacent pump sources with respect to one another between two of the Raman amplifiers.

13. An optical transmission system as claimed in claim 10, wherein, in a transmission path with N Raman amplifiers, the pump wavelength sets are shifted with respect to one another by approximately 1/N of a wavelength separation between two adjacent pump sources.

14. An optical transmission system as claimed in claim 10, wherein the wavelengths of the pump signals of the Raman amplifiers are chosen individually such that the gain spectrum has minimum differences.

15. An optical transmission system as claimed in claim 10, wherein the transmission path has successive Raman amplifiers with a maximum of four different pump wavelength sets.

16. An optical transmission system as claimed in claim 10, wherein a power of the pump sources within the bandwidth of the stimulated Brillouin scatter is below a stimulated Brillouin scatter threshold.

* * * * *